(12) United States Patent
Toyoshima et al.

(10) Patent No.: US 12,260,178 B2
(45) Date of Patent: Mar. 25, 2025

(54) COMMUNICATION ASSISTANCE SERVER, COMMUNICATION ASSISTANCE SYSTEM, COMMUNICATION ASSISTANCE METHOD, AND COMMUNICATION ASSISTANCE PROGRAM

(71) Applicant: Aill Inc., Tokyo (JP)

(72) Inventors: China Toyoshima, Tokyo (JP); Hidenori Kawamura, Hokkaido (JP)

(73) Assignee: AILL INC., Tokyo (JP)

( * ) Notice: Subject to any disclaimer, the term of this patent is extended or adjusted under 35 U.S.C. 154(b) by 336 days.

(21) Appl. No.: 17/599,340

(22) PCT Filed: Mar. 29, 2019

(86) PCT No.: PCT/JP2019/014179
§ 371 (c)(1),
(2) Date: Sep. 28, 2021

(87) PCT Pub. No.: WO2020/202315
PCT Pub. Date: Oct. 8, 2020

(65) Prior Publication Data
US 2022/0180069 A1   Jun. 9, 2022

(51) Int. Cl.
*G06F 40/30* (2020.01)
*H04L 51/02* (2022.01)
(Continued)

(52) U.S. Cl.
CPC .............. *G06F 40/30* (2020.01); *H04L 51/02* (2013.01); *H04L 51/42* (2022.05); *H04L 51/52* (2022.05)

(58) Field of Classification Search
CPC ......... G06F 40/30; H04L 51/42; H04L 51/52; H04L 51/02
See application file for complete search history.

(56) References Cited

U.S. PATENT DOCUMENTS 9,805,718 B2 * 10/2017 Ayan .................... H04M 3/4936
10,073,830 B2 * 9/2018 Walia ...................... G06F 16/35
(Continued)

FOREIGN PATENT DOCUMENTS

JP       3052673       7/1998
JP    2002-32518       1/2002
(Continued)

OTHER PUBLICATIONS

Ren, Yafeng, and Donghong Ji, "Neural networks for deceptive opinion spam detection: An empirical study", Jan. 2017, Information Sciences 385, pp. 213-224. (Year: 2017).*

(Continued)

*Primary Examiner* — Daniel C Washburn
*Assistant Examiner* — James Boggs
(74) *Attorney, Agent, or Firm* — GREENBLUM & BERNSTEIN P.L.C.

(57) ABSTRACT

A communication support server includes: a message content analysis unit configured to analyze a content of a message transmitted from a first terminal device used by a first user and/or a second terminal device used by a second user; a question information generation unit configured to generate question information to be transmitted to the first user based on the content of the message analyzed by the message content analysis unit; and an assist message generation unit configured to generate an assist message to be transmitted only to the second terminal device based on answer information that is an answer of the first user to the question information.

14 Claims, 9 Drawing Sheets

(51) Int. Cl.
  *H04L 51/42*  (2022.01)
  *H04L 51/52*  (2022.01)

(56) References Cited

U.S. PATENT DOCUMENTS

| | | | |
|---|---|---|---|
| 10,417,266 B2* | 9/2019 | Patel | G06F 16/3322 |
| 10,516,637 B2* | 12/2019 | Ghotbi | G06F 3/167 |
| 10,530,723 B2* | 1/2020 | Milligan | H04L 51/02 |
| 10,565,244 B2* | 2/2020 | Kershaw | G06F 40/30 |
| 10,877,977 B2* | 12/2020 | Garg | H04L 51/52 |
| 11,010,561 B2* | 5/2021 | Bellegarda | G06F 40/30 |
| 11,252,117 B2* | 2/2022 | Mukherjee | G06F 40/40 |
| 11,531,998 B2* | 12/2022 | Kopikare | G06N 5/046 |
| 2008/0065371 A1 | 3/2008 | Nakano et al. | |
| 2014/0017646 A1* | 1/2014 | Seitzberg, III | G09B 19/00 434/236 |
| 2016/0162488 A1* | 6/2016 | Corradi | G06Q 10/1053 707/734 |
| 2017/0169390 A1* | 6/2017 | Wesselink | H04L 51/216 |
| 2017/0180276 A1 | 6/2017 | Gershony et al. | |
| 2019/0222540 A1* | 7/2019 | Relangi | H04M 3/42042 |
| 2022/0180069 A1 | 6/2022 | Toyoshima et al. | |

FOREIGN PATENT DOCUMENTS

| | | |
|---|---|---|
| JP | 2002-358367 | 12/2002 |
| JP | 2007-200159 | 8/2007 |
| JP | 2008-52449 | 3/2008 |
| JP | 2011-108052 | 6/2011 |
| JP | 2014-63407 | 4/2014 |
| JP | 2017-168053 | 9/2017 |
| JP | 2019-508820 | 3/2019 |
| JP | 2019-101659 | 6/2019 |
| JP | 7104278 | 7/2022 |
| WO | 2006/093092 | 9/2006 |

OTHER PUBLICATIONS

Aug. 22, 2023 Notice of Reasons for Refusal in corresponding Japanese Application No. 2022-085588 and English translation thereof.

Jun. 18, 2019 International Search Report issued in International Patent Application No. PCT/JP2019/014179 and English translation thereof.

Jan. 25, 2022 Japanese Office Action in Japanese Application No. 2021-511695 and English translation thereof.

"Marriage Activities Supported by AI with 1.8 Million Records," Nikkei XTREND, Japan, Nikkel Business Publications, Inc., Jul. 14, 2018, No. 4, pp. 2-7 and English translation thereof.

"Our Chat Is Being Analyzed! I Tried Using AILL, Part 1," pp. 2-4, online Feb. 22, 2019, searched on Jan. 17, 2022, URL:https://ameblo.jp/apple2454/entry-12439990475.html, and English translation thereof.

"Found and Registered to Trial of Matching Service," online, Jan. 30, 2019, pp. 2-4, URL:https://ameblo.jp/apple2454/entry-12436461002.html; and English translation thereof.

"Is Artificial Intelligence Smart? I Tried Using AILL, Part 2," online Feb. 23, 2019, searched on Jan. 17, 2022, pp. 2-5, URL: https://ameblo.jp/apple2454/entry-12440475206.html; and English translation thereof.

Sep. 10, 2024 Japanese Office Action issued in a corresponding Japanese Patent Application No. 2023-201332 and translation thereof.

Junko Ito et al., "Anonymous communication support system using moderate relationship with third person", Journal of Human Interface Society, vol. 17, No. 2, 2015, pp. 55-66 and English Abstract.

* cited by examiner

COMMUNICATION ASSISTANCE SERVER, COMMUNICATION ASSISTANCE SYSTEM, COMMUNICATION ASSISTANCE METHOD, AND COMMUNICATION ASSISTANCE PROGRAM

TECHNICAL FIELD

The present invention relates to a communication support server, a communication support system, a communication support method, and a communication support program that support communications between people via a network.

BACKGROUND ART

Social networking services (SNSs) are widely used as a communication tool between people via a network. The SNSs often have chat, messenger, and other functions to allow real time communications. In provided techniques, systems intervene in communications among people to establish smoother communications.

Important things to establish smoother communications are understanding the emotions and feelings (i.e., true meanings of the messages and true feelings) of a partner and exchanging messages in accordance with the partner's feelings. Techniques for estimating the partner's feelings are known. Patent Document 1 describes converting the utterance amount or other data into the degrees of conversation activity. An end wish determination unit 13 sums the obtained degrees of conversation activity. If the summed degree has been less than a threshold a for a predetermined time or more, the end wish determination unit 13 determines that a user wishes to end a communication.

CITATION LIST

Patent Document

Patent Document 1: Japanese Unexamined Patent Publication No. 2011-108052

SUMMARY OF THE INVENTION

Technical Problem

However, Patent Document 1 describes merely estimating whether the user wishes to continue the communication based on the degrees of conversation activity according to the utterance amount or other data, and fails to describe directly checking the partner's true feelings. More advanced smoothing of communications may thus be difficult.

The present invention was made to solve such a the problem. It is thus an objective of the present invention to provide a communication support server, a communication support system, an inspected communication support method, and an inspected communication support program capable of supporting people in smoothing a communication via a chat by asking an inputter the true meaning of a comment input during the communication.

Solution to the Problem

In order to achieve the objective, a communication support server according to the present invention includes: a message content analysis unit configured to analyze a content of a message transmitted from a first terminal device used by a first user and/or a second terminal device used by a second user; a question information generation unit configured to generate question information to be transmitted to the first user based on the content of the message analyzed by the message content analysis unit, and an assist message generation unit configured to generate an assist message to be transmitted only to the second terminal device based on answer information that is an answer of the first user to the question information.

The question information generation unit may generate the question information on a feeling of the first user for the second user.

The question information generation unit may generate the question information as a plurality of options. The assist message generation unit may generate the assist message according to an option selected by the first user from the plurality of options in the answer information.

The message content analysis unit may calculate a degree of good feeling of the first user for the second user based on the answer information.

The communication support server may further include: a control unit configured to transmit, to the first terminal device, the degree of good feeling of the second user for the first user calculated by the message content analysis unit.

The communication support server may further include: an assistance necessity determination unit configured to determine whether assistance related to input of another message is necessary for the second user. The assistance necessity determination unit may determine whether the assistance related to the input of the other message is necessary for the first user or the second user based on the degree of good feeling.

The communication support server may further include: a personal information storage unit configured to store first personal information that is personal information on the first user and second personal information that is personal information on the second user; and a matching candidate extraction unit configured to determine a matching rate between the first user and the second user based on the first personal information and the second personal information, and determines whether the matching rate satisfies a predetermined condition. If the matching rate is determined to satisfy the predetermined condition, the matching candidate extraction unit may generate friend request information for the first terminal device and/or the second terminal device.

The message content analysis unit may store, as the first personal information and/or the second personal information, the content of the message analyzed.

In order to achieve the objective, a communication support system according to the present invention includes: a first terminal device used by a first user; a second terminal device used by a second user; and a communication support server connectable to the first terminal device and the second terminal device via a network, the communication support server including: a message content analysis unit configured to analyze a content of a message transmitted from the first terminal device and/or the second terminal device; a question information generation unit configured to generate question information to be transmitted to the first user based on the content of the message analyzed by the message content analysis unit; and an assist message generation unit configured to generate an assist message to be transmitted only to the second terminal device based on answer information that is an answer of the first user to the question information.

In order to achieve the objective, a communication support method according to the present invention includes: analyzing a content of a message transmitted from a first terminal device used by a first user and/or a second terminal device used by a second user, using a message content analysis unit; generating question information to be transmitted to the first user based on the content of the message analyzed by the message content analysis unit, using a question information generation unit, and generating an assist message to be transmitted only to the second terminal device based on answer information that is an answer of the first user to the question information, using an assist message generation unit.

In order to achieve the objective, a communication support program according to the present invention includes: analyzing a content of a message transmitted from a first terminal device used by a first user and/or a second terminal device used by a second user; generating question information to be transmitted to the first user based on the content of the message analyzed; and generating an assist message to be transmitted only to the second terminal device based on answer information that is an answer of the first user to the question information.

Advantages of the Invention

The communication support server, the communication support system, the inspected communication support method, and the inspected communication support program according to the present invention using the means described above support people in smoothing a communication via a chat by asking an inputter the true meaning of a comment input during the communication.

DESCRIPTION OF EMBODIMENT

Figure 1:
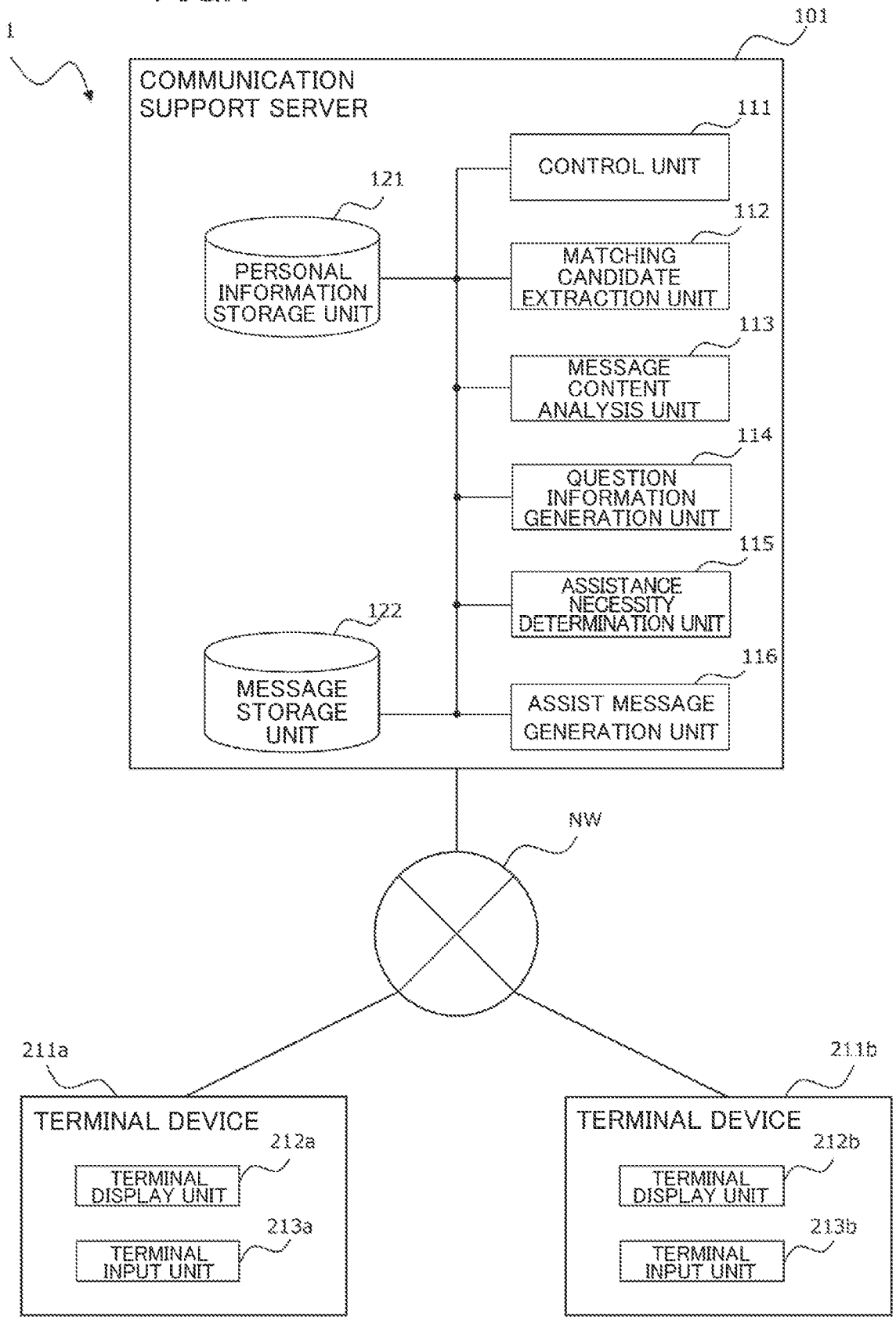
FIG. 1 is a system configuration diagram showing a communication support system according to an embodiment of the present invention.

An embodiment of the present invention will now be described with reference to the drawings.
<Configuration>
FIG. 1 is a system configuration diagram showing a communication support system 1 including a communication support server 101 according to an embodiment of the present invention. The communication support system 1 is operated by a service provider (hereinafter, referred to as a "provider") to support registered users in matching each other, and supports the users who have become friends as a result of the matching in establishing communications. Specifically, the service proposes matching candidates among a plurality of users who have registered their requirements for a partner to be matched and their personal information, and becomes friends after submitting and accepting friend requests. Users who have become friends communicate with each other via chats. The communication support system 1 aims to establish smooth communications by intervening in communications in accordance with the contents of messages during the chats and assisting the users. In the present invention, the terms "assist" and "assistance" mean actions such as advices, proposals, or recommendations.

The users of the service register their personal information at the time of service registration. The personal information on each user includes the items, such as the information on the username (or nickname), age, occupation, income, hobbies, sense of values, and life plan, which are input as the user's own profile at the time of registration, and the items such as the age, occupation, income, hobbies, sense of values, and life plan, which are required for a matching partner. Further, the personal information on each user may include characteristic information indicating the characters according to the contents of the messages in the past chats in the communication support system 1.

As shown in FIG. 1, the communication support system 1 according to this embodiment is configured by connecting terminal devices 211 (e.g., terminal devices 211a and 211b) of the users and the communication support server 101 of the provider via a network NW such as the Internet or a virtual private network (VPN). For the sake of simplicity, FIG. 1 shows only the terminal device 211a (i.e., a first terminal device) and the terminal device 211b (i.e., a second terminal device) assuming two users. The communication support server 101 may be however connected to three or more users via the network NW.

The communication support server 101 includes a control unit 111, a matching candidate extraction unit 112, a message content analysis unit 113, a question information generation unit 114, an assistance necessity determination unit 115, an assist message generation unit 116, a personal information storage unit 121, and a message storage unit 122.

The control unit 111 controls exchanges of information among the terminal devices 211a and 211b and the communication support server 101. The control unit 111 transmits and receives the messages transmitted from the terminal devices 211a and 211b, transmits question information to the terminal device 211b, and receives answer information to the question information from the terminal device 211b.

The matching candidate extraction unit 112 extracts matching candidates from personal information on a plurality of users stored in the personal information storage unit 121 which will be described later. Specifically, the matching candidate extraction unit 112 weights and scores information on the age, annual income, and hobbies, for example, recorded as the personal information on the other users to calculate matching rates, and extracts the users with high matching rates as the matching candidates. The personal information may include characteristic information as indexes of the characters analyzed based on the message exchanges of the users in the past. For example, a user who has input messages in accordance with assist messages in the past message exchanges may be provided with the characteristic information with an index indicating that the user is a "amenable person". The matching candidates may then be extracted in accordance with the characteristic information. The matching candidate extraction unit 112 generates and transmits friend request information to the users extracted as the matching candidates. The matching candidate extraction unit 112 may extract the matching candidates through machine learning trained using, as training data, past interactions between the users and matching conditions.

The message content analysis unit 113 analyzes the contents of the messages input by a user A (or a first user) or a user B (or a second user). The message content analysis unit 113 may analyze the contents of the messages based on the flows of the message exchanges. Specifically, for example, the analysis may be made based on the information such as the length of each message, the number of messages once each chat starts, and the duration of each message exchange in a plurality of message exchanges. The analysis may be made in comparison with the other users. For example, the interchanges between the users A and B may be compared to those between the users A and another user (i.e., other than the user B) or between other users to analyze whether the flow is positive or negative. Based on the result of analyzing the contents of the messages input by the user A or B (i.e., the first or second user), the message content analysis unit 113 attempts to estimate the true meanings of the messages (i.e., the inputters' true feelings). The true meanings include whether each message is from the heart or out of politeness or whether the user B has a good impression of the user A. If the message content analysis unit 113 determines that the true meanings cannot be estimated, the question information generation unit 114, which will be described later, generates question information to be transmitted to the user A.

In addition, the message content analysis unit 113 may analyze the contents of the messages to calculate the user A's degree of good feeling for the user B and the user B's degree of good feeling for the user A. For example, if positive conversations are found in the past message exchanges between the users A and B, the degree of good feeling is increased, whereby higher degree of good feeling is calculated. On the other hand, if negative conversations are found, the degree of good feeling is decreased, whereby lower degree of good feeling is calculated. The message content analysis unit 113 may calculate the user B's degree of good feeling for the user A based on answer information to the question information which will be described later. For example, the question information on the user B's impression of the user A is a selection of five options: "Good", "Not bad", "Average", "Not good", and "Bad". If the answer information from the user B indicates "Not bad", the user B's degree of good feeling for the user A may be increased. If the answer information from the user B indicates "Bad", the user B's degree of good feeling for the user A may be reduced. The information on the user A's degree of good feeling for the user B calculated by the message content analysis unit 113 is transmitted through the control unit 111 to the terminal device 211b of the user B. On the other hand, the information on the user B's degree of good feeling for the user A calculated by the message content analysis unit 113 is transmitted through the control unit 111 to the terminal device 211a of the user A. The message content analysis unit 113 may analyze messages through machine learning trained using, as training data, past message exchanges.

The question information generation unit 114 generates question information to be transmitted to the user B based on the contents of the messages analyzed by the message content analysis unit 113. For example, the question information is about the user A's feelings for the user B and for the communication support system 1 checking the true meanings of the messages, such as whether a message transmitted by the user B to the user A is from the heart or out of politeness or whether the user B has a good impression of the user A.

The assistance necessity determination unit 115 determines whether assistance through intervention by the communication support server 101 is necessary for the message exchanges between the users A and B based on the contents of the messages analyzed by the message content analysis unit 113, the answer information transmitted by the user B to the question information generated by the question information generation unit 114, and the information on the degree of good feeling. For example, the question information on the user B's impression of the user A is a selection of five options: "Good", "Not bad", "Average", "Not good", and "Bad". If the answer information from the user B indicates "Not bad", the user B's impression of the user A is determined to be positive. The degree of the positive impression may be assigned as an index of a parameter such as about 80%. In addition, if the B's degree of good feeling for the user A satisfies a predetermined value, the assistance necessity determination unit 115 may determine that there is a need to transmit an assist message causing the user A to communicate positively. Further more, if the user B makes a negative response to a positive offer by the user A, the assistance necessity determination unit 115 may determine that assistance is necessary for the user A to improve the situation.

The assist message generation unit 116 generates assist messages according to the analyzed contents of the messages. The assist message generation unit may generate assist messages suitable for the analyzed contents of the messages through machine learning using, as training data, the past message exchanges and their results such as the information on whether the communications have proceeded smoothly.

The personal information storage unit 121 stores the personal information on the users registered in the service. The personal information storage unit 121 further stores the users' degrees of good feeling for other users. For example, the personal information storage unit 121 stores the user A's degree of good feeling for the user B and the user B's degree of good feeling for the user A in association with their personal information.

The message storage unit 122 stores the contents of messages in chats between users.

The terminal devices 211 (e.g., the terminal devices 211a and 211b) are portable terminals such as PCs, smartphones, tablet PCs, and cellular phones, and are terminals capable of displaying at least web information. The terminal devices 211 (e.g., the terminal devices 211a and 211b) may access the communication support server 101 using dedicated application software installed therein. The terminal devices 211 may access the communication support server 101 under an operating environment (e.g., an application programming interface (API) or a platform) provided by the communication support server 101.

Each terminal display unit 212 (e.g., a terminal display unit 212a or 212b) is a display unit such as a liquid crystal display or an organic electroluminescent layer display of a smartphone. Alternatively, each terminal display unit 212 may be a display device independent from the associated one of the terminal devices 211. Each terminal display unit 212 displays the messages transmitted from the communication support server 101 or information on the degree of good feeling.

Each terminal input unit 213 (e.g., a terminal input unit 213a or 213b) is, for example, an input device such as a touch panel integral with the associated one of the terminal display units 212 (e.g., the terminal display units 212a and 212b) such as the liquid crystal displays or the organic EL displays of the smartphones. Alternatively, each terminal input unit 213 may be a keyboard independent from the associated one of the terminal display units 212 (e.g., the terminal display units 212a and 212b) or from the associated one of the terminal devices 211. Further alternatively, each terminal input unit 213 may be an audio input device.

<Terminal Device Screen>

Now, display screens that may be displayed on the terminal devices 211 according to the embodiment of the present invention will be described with reference to FIGS. 2 to 7.

Figure 2:
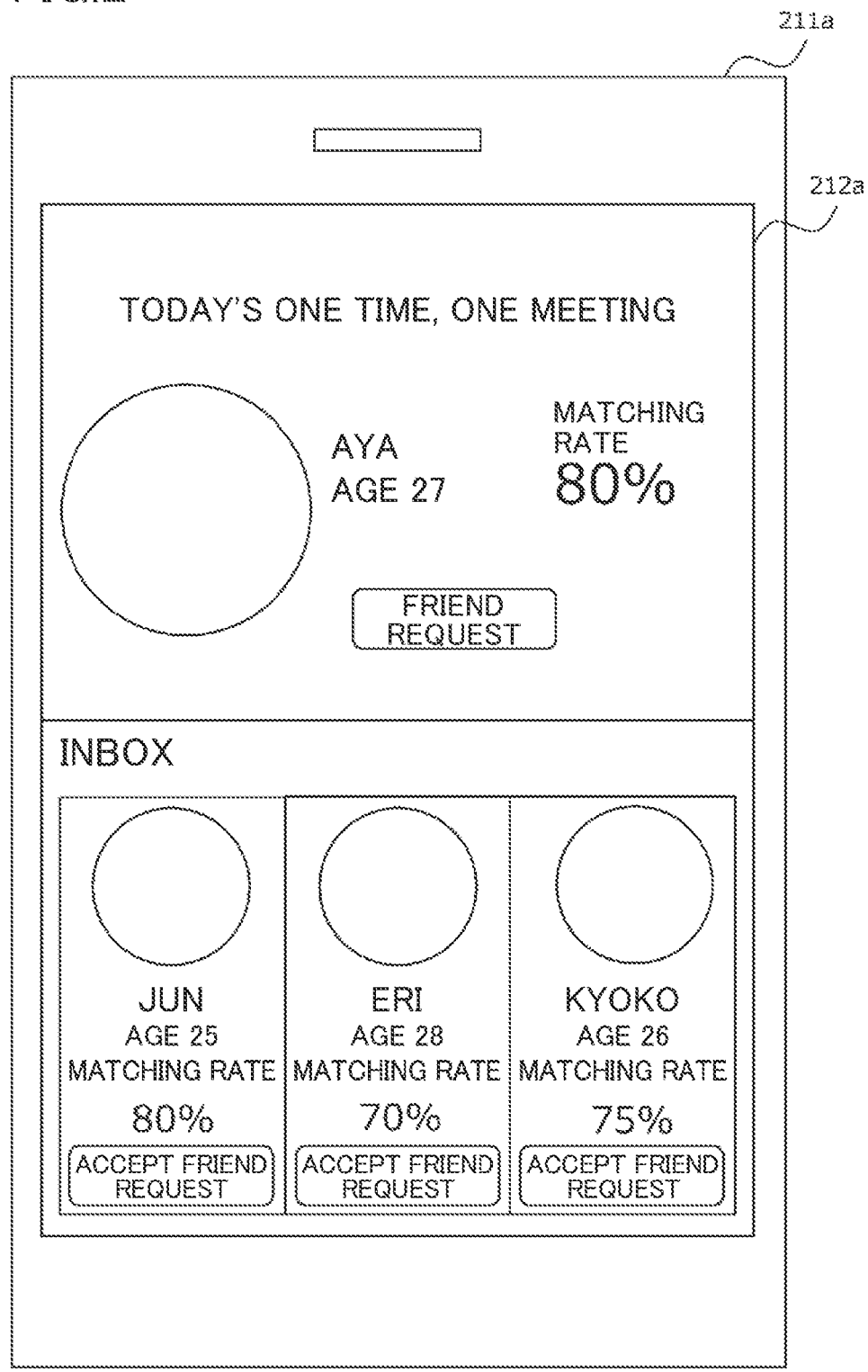
FIG. 2 is a schematic diagram showing a screen of a terminal device 211a of a user A after receiving matching candidate information.

FIG. 2 is a schematic diagram showing the terminal device 211a of the user A at the time of notifying the users of matching candidates. FIG. 2 is a screen showing that the user B, Aya is introduced as a matching candidate to the user A, Kenta. The screen also shows that the matching rate between Kenta and Aya is 80%. If Kenta likes Aya, Kenta presses the button "FRIEND REQUEST" displayed based on the friend request information to make a friend request to Aya. In the lower half of the screen, "INBOX" indicates the users who have made a friend request to Kenta. The screen also shows that the matching rate between Kenta and Jun is 80%, between Kenta and En 70%, and between Kenta and Kyoko 75%. For example, if Kenta likes Jun, Kenta presses the bottom "ACCEPT FRIEND REQUEST" under "JUN" to become friends with Jun.

Figure 3:
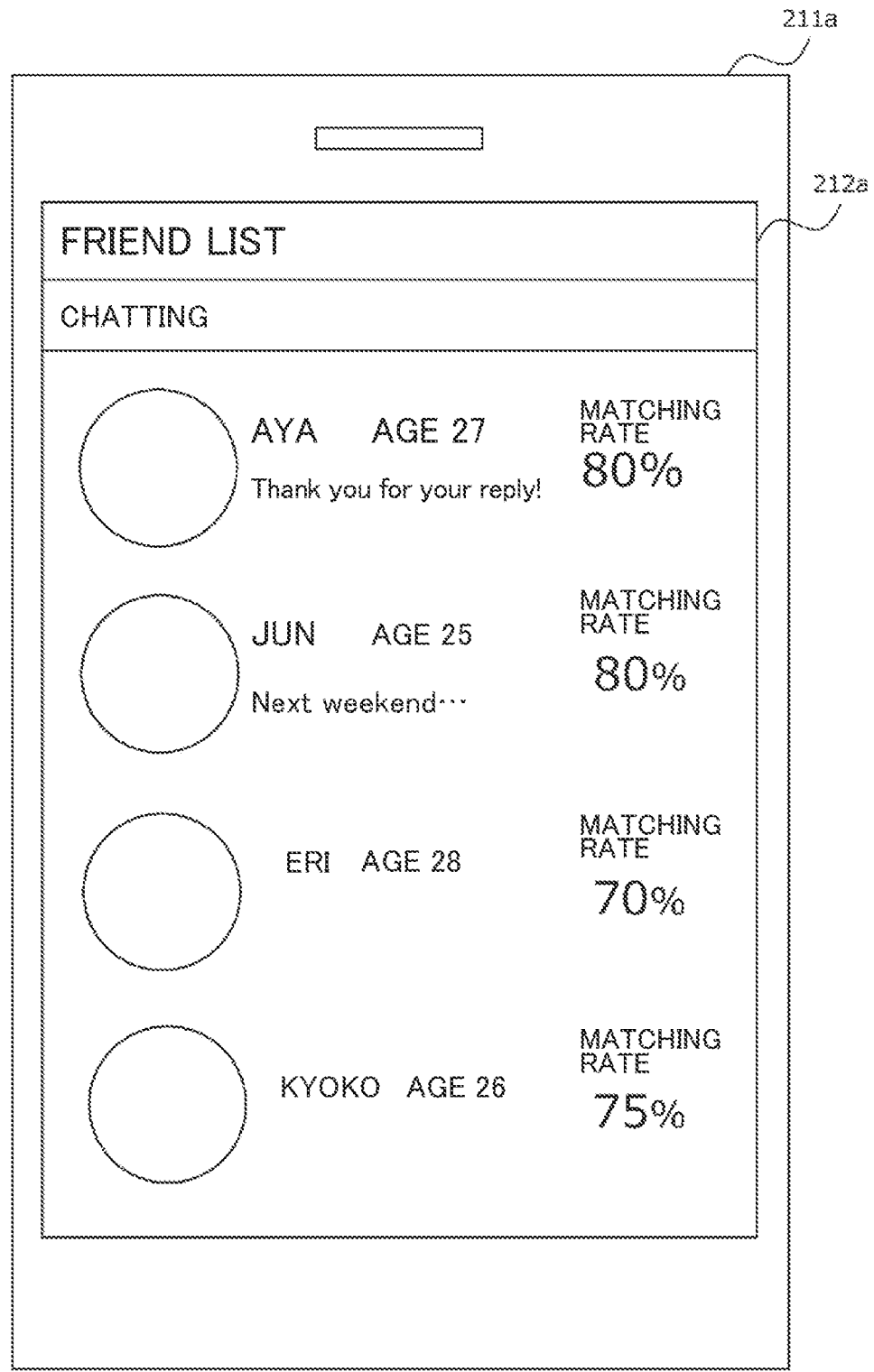
FIG. 3 is a schematic diagram showing a screen of the terminal device 211a of the user A displaying the friend list of the user A.

FIG. 3 is a schematic diagram showing the terminal device 211a displaying the friend list of the user A, Kenta. The user A selects a friend to shift to the chat screen and exchange messages via a chat.

Figure 4:
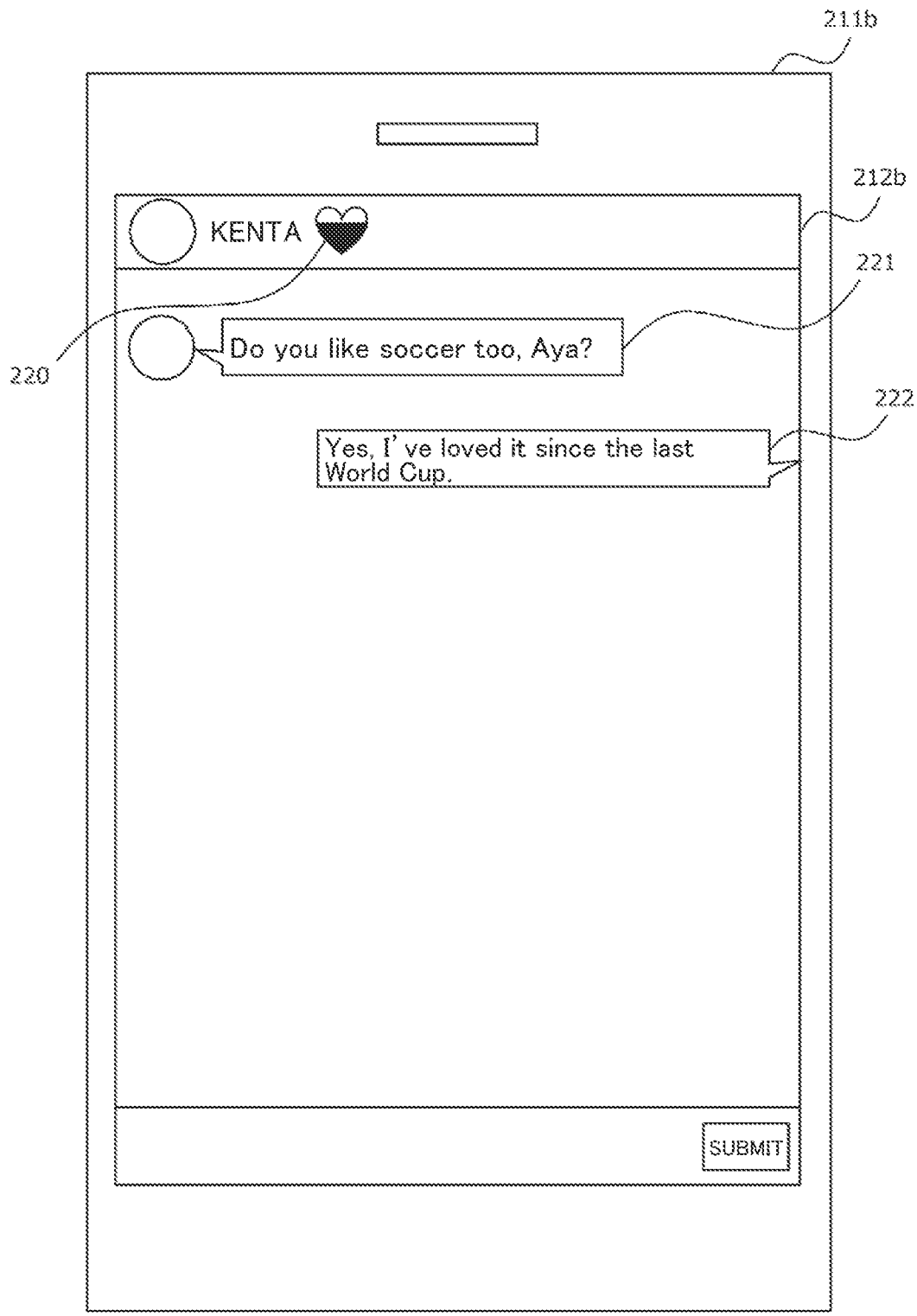
FIG. 4 is a schematic diagram showing a screen of a terminal device 211b of a user B during the chat with the user A.

FIG. 4 is a schematic diagram showing a screen of the terminal device 211b of the user B, Aya during the chat with the user A, Kenta. A gauge 220 is a display indicating the user A's degree of good feeling for the user B. A higher level of the gauge means a higher degree of good feeling. Through the gauge 220, the user B timely knows the chatting partner, that is, the user A's degree of good feeling. The gauge 220 may thus be a motivation to consider further message contents according to the displayed degree of good feeling. A message 221 has been input by the user A, while a message 222 has been input by the user B.

Figure 5:
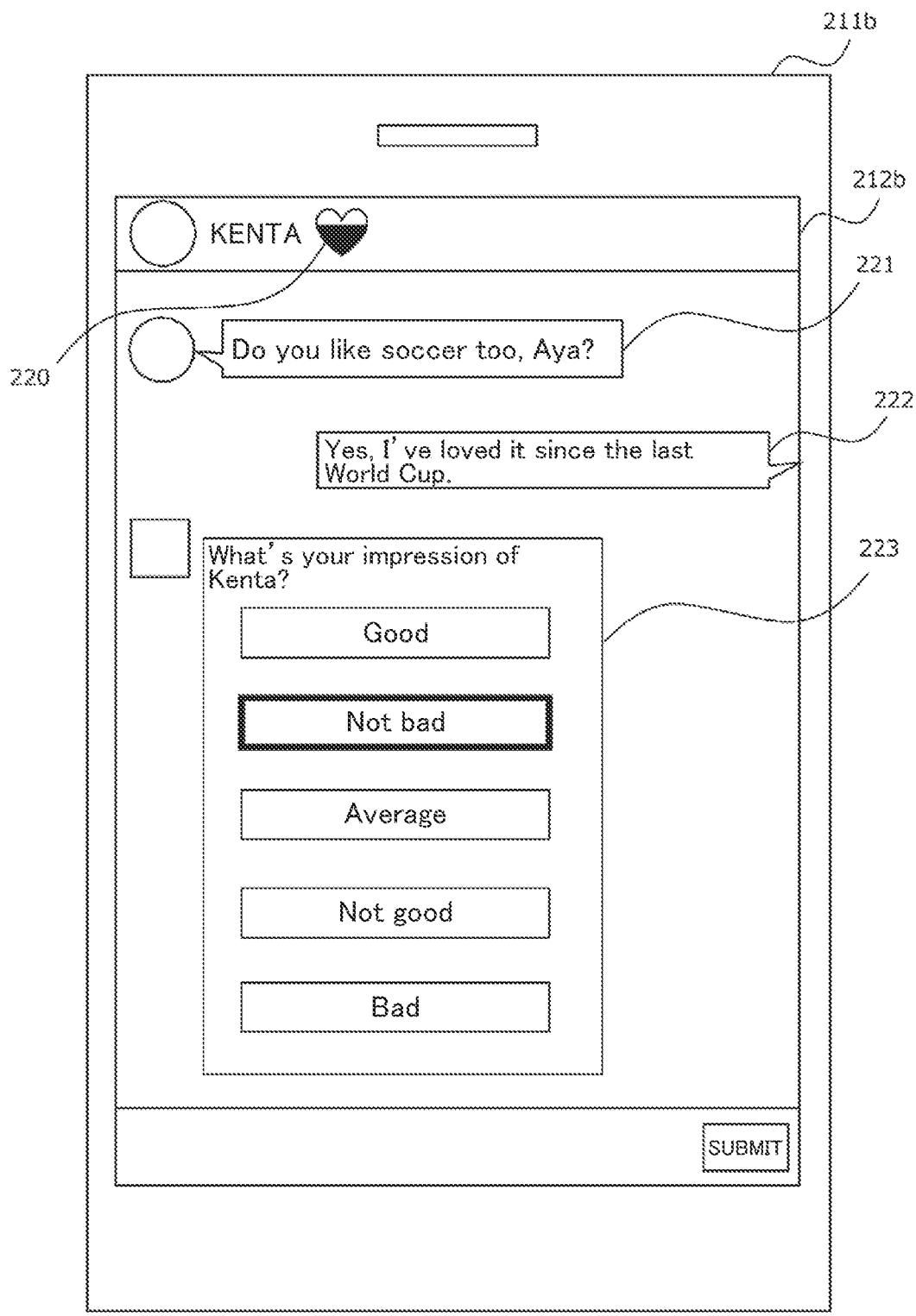
FIG. 5 is a schematic diagram showing a screen of a terminal device 211b of the user B during the chat with the user A.

FIG. 5 is a schematic diagram showing a screen of the terminal device 211b and following FIG. 4 in the chronological order. Based on the exchange of the messages 221 and 222, question information 223 is displayed to ask the user B her impression of the user A. The question information 223 is to ask the impression of the user A and displayed as a selection of five options: "Good", "Not bad", "Average", "Not good", and "Bad". In FIG. 5, the user B is selecting "Not bad" surrounded by a bold line. The user B inputs the fact that she has a relatively positive impression of the user A to allow the communication support system 1 to collect information on the user B's feelings.

Figure 6:
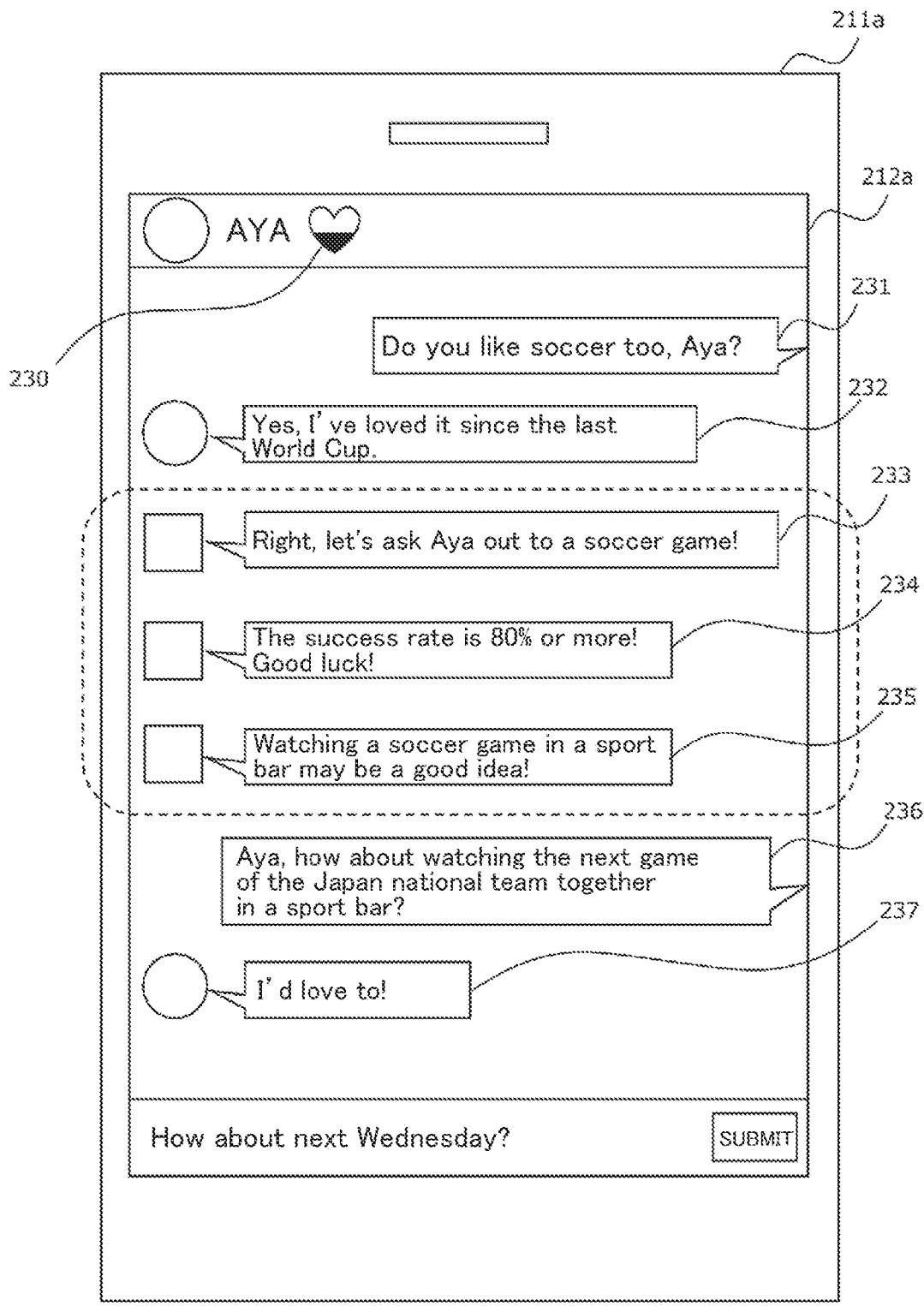
FIG. 6 is a schematic diagram showing a screen of the terminal device 211a of the user A during the chat with the user B.

FIG. 6 is a schematic diagram showing a screen of the terminal device 211a of the user A, Kenta during a chat with the user B, Aya. A gauge 230 is a display indicating the user B's degree of good feeling for the user A. A higher level of the gauge means a higher degree of good feeling. Through the gauge 230, the user A timely knows the degree of good feeling of the chatting partner, that is, the user B. The gauge 230 may thus be a motivation to consider further message contents according to the displayed degree of good feeling. Messages 231 and 236 have been input by the user A, while messages 232 and 237 have been input by the user B. Assist messages 233, 234, and 235 (surrounded by a dotted line) have been generated by the assist message generation unit 116 of the communication support server 101. The assist messages 233, 234, and 235 have been generated based on the user B's relatively positive impression of the user A as illustrated in FIG. 5. Based on the fact that the users have exchanged messages on soccer and the information on the positive impression, the communication support system 1 displays an assist message to encourage the user A to ask the user B out to a soccer game as indicated by the assist message 233. In addition, the success rate of about 80% associated with the option "Not bad" as the answer information from the user B is displayed as the assist message 234.

Figure 7:
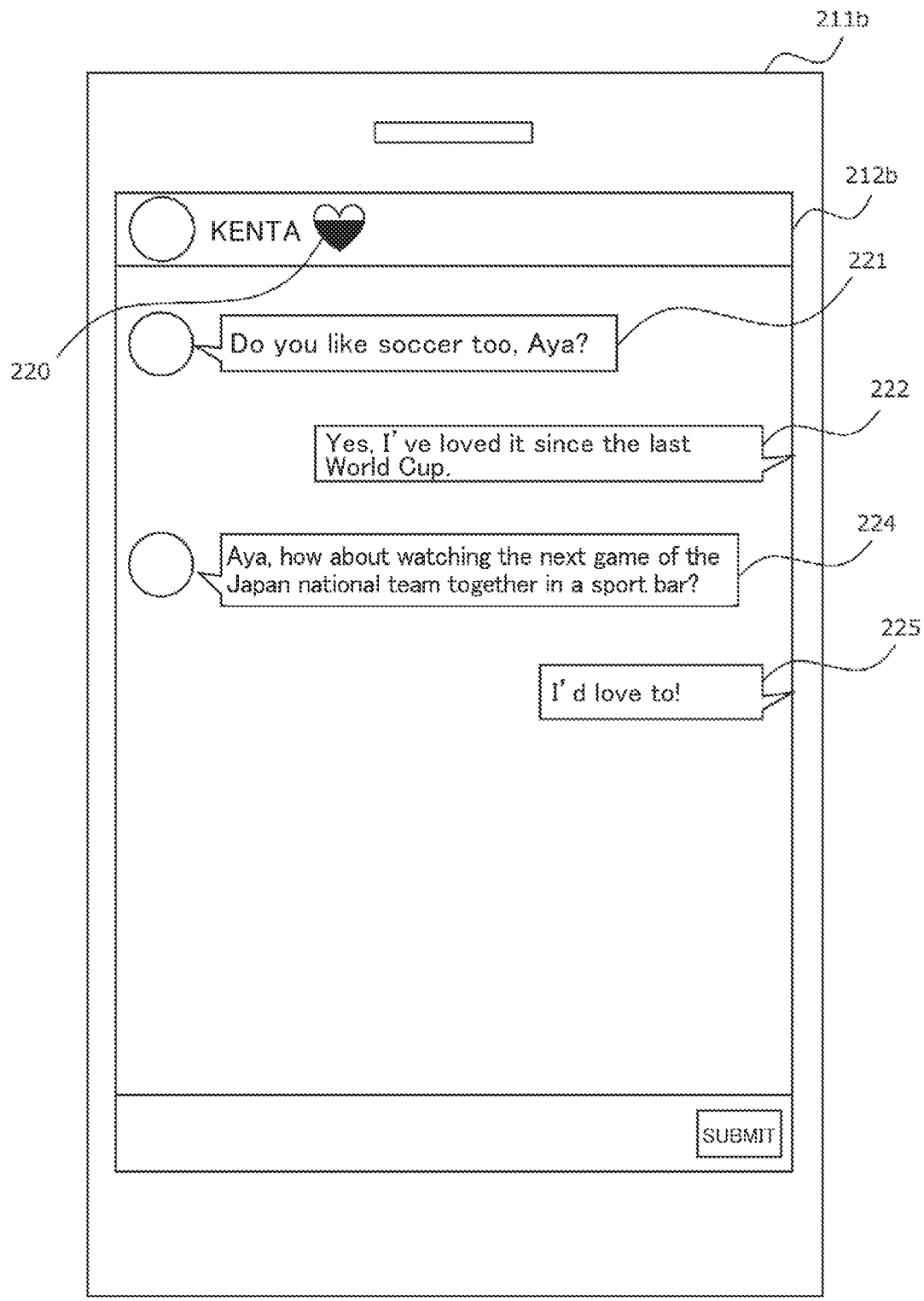
FIG. 7 is a schematic diagram showing a screen of the terminal device 211b of the user B during the chat with the user A.

FIG. 7 is a schematic diagram showing a screen of the terminal device 211b and following FIGS. 4 and 5 in the chronological order. The messages 231, 232, 236, and 237 in FIG. 6 are also displayed in FIG. 7 as messages 221, 222, 224, and 225, respectively, and thus visible to both the users A and B. However, the assist messages 233, 234, and 235 in FIG. 6 have been generated as a result of determination by the assistance necessity determination unit 115 that an assist message for the user A is necessary. These messages are thus visible only to the user A, that is, displayed only on the terminal display unit 212a of the terminal device 211a. Accordingly, the user A can follow the assistance without the assist message known by the communication partner.

<Processing Flow>

Now, an operation of the communication support system 1 according to this embodiment of the present invention will be described with reference to the flowchart shown in FIG. 8.

Figure 8:
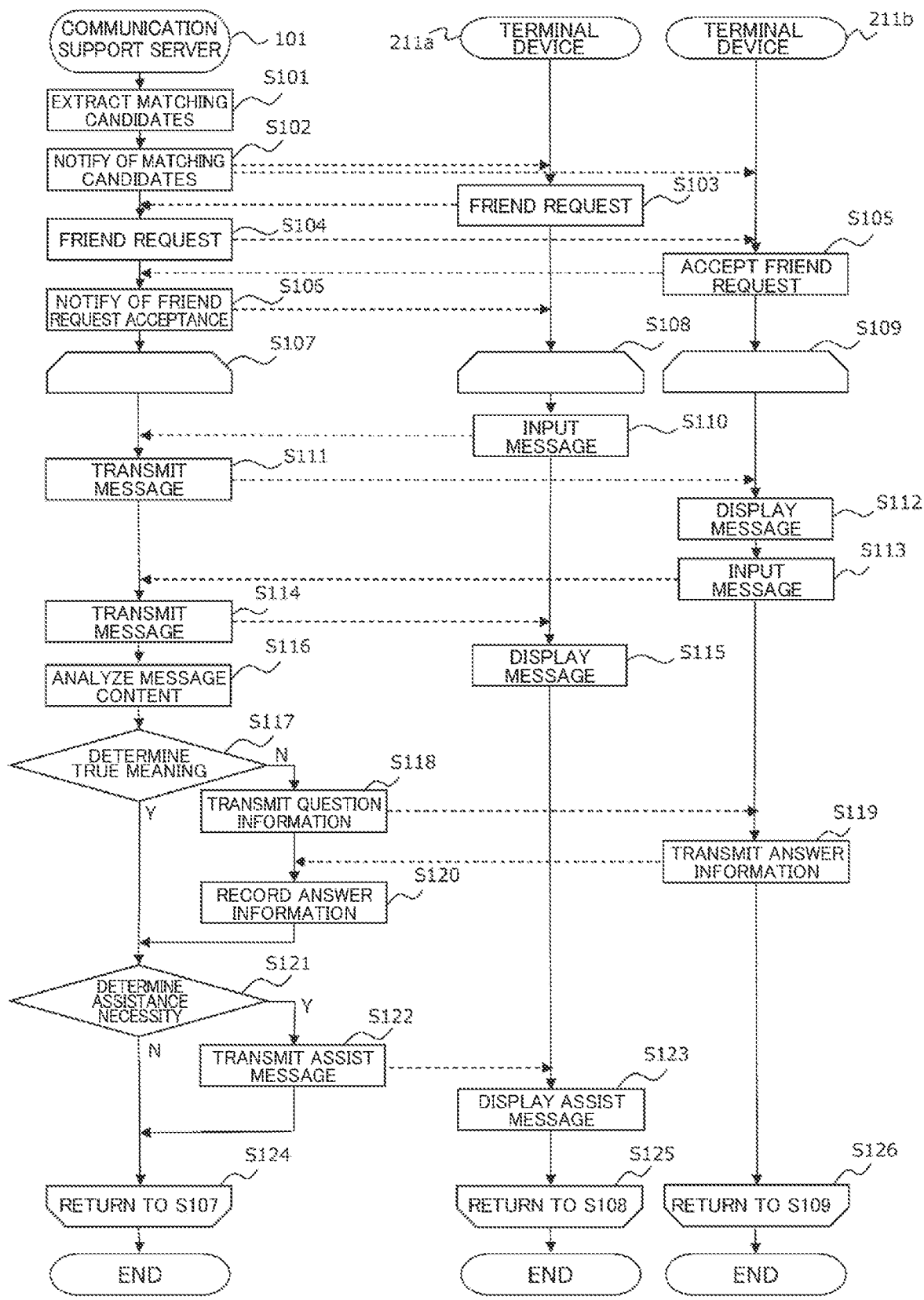
FIG. 8 is a flowchart showing an operation procedure of a communication support system 1 according to the embodiment of the present invention.

The flowchart of FIG. 8 shows the relationship among the operations of the communication support server 101, the terminal device 211a of the user A. and the terminal device 211b of the user B.

In step S101, the matching candidate extraction unit 112 of the communication support server 101 extracts matching candidates based on the personal information on a plurality of users stored in the personal information storage unit 121. The personal information may include characteristic information as indexes of the characters analyzed based on the message exchanges of the users in the past. The matching candidates may be then extracted in accordance with the characteristic information.

In step S102, the control unit 111 notifies each of the matching candidates extracted in step S101 of matching candidate information, which corresponds to the information "TODAY'S ONE TIME, ONE MEETING" in FIG. 2. Specifically, the information on a matching candidate, for example, the information on the user A is transmitted to the terminal device 211b, and the information on the user B is transmitted to the terminal device 211a.

In step S103, if the user A who has received the matching candidates in step S102 likes the user B, the user A may make a friend request. Specifically, the user A presses the button "FRIEND REQUEST" on the terminal input unit 213a of the terminal device 211a to transmit the information on the friend request to the communication support server 101.

In step S104, based on the information on the friend request transmitted in step S103, the control unit 111 transmits the information to user B. Specifically, the control unit 111 transmits the friend request information from the user A to the terminal device 211b.

In step S105, if the user B who has received the friend request information in step S104 likes the user A, the user B may accept the friend request. Specifically, the user B presses the button "ACCEPT FRIEND REQUEST" on the terminal input unit 213b of the terminal device 211b to transmit the information on the friend request acceptance to the communication support server 101.

In step S106, the control unit 111 notifies the user A that the user B has accepted the friend request. Specifically, the control unit 111 transmits the information on the friend request acceptance to the terminal device 211a to notify the user A that the user A and the user B are ready to exchange messages.

In step S107, the communication support server 101 repeats the processing to step S124. This processing is synchronized with the repetitive processing by the terminal device 211a in steps S108 to S125 and by the terminal device 211b in steps S109 to S126. Once the repetitive processing by the terminal device 211a or 211b ends, the repetitive processing in steps S107 to S124 ends.

In step S108, the terminal device 211a repeats the processing in steps S108 to S125. Similarly, in step S109, the terminal device 211b repeats the processing in steps S109 to S126.

In step S110, the user A inputs the messages to be transmitted to the user B through the terminal input unit 213a of the terminal device 211a. The terminal device 211a transmits the input messages to the communication support server 101.

In step S111, the control unit 111 transmits the messages transmitted in step S110 to the user B. Specifically, the messages transmitted in step S110 are stored in the message storage unit, and the stored messages are transmitted to the terminal device 211b of the user B.

In step S112, the terminal device 211b displays the messages transmitted in step S11 on the terminal display unit 212b.

In step S113, the user B inputs the messages to be transmitted to the user A through the terminal input unit 213b of the terminal device 211b. The terminal device 211b transmits the input messages to the communication support server 101.

In step S114, the control unit II transmits the messages transmitted in step S113 to the user A. Specifically, the messages transmitted in step S113 are stored in the message storage unit 122, and the stored messages are transmitted to the terminal device 211a of the user A.

In step S115, the terminal device 211a displays the messages transmitted in step S114 on the terminal display unit 212a.

In step S116, the message content analysis unit 113 analyzes the contents of the messages stored in steps S111 and S114. The message may be analyzed together with the messages transmitted in the past. In addition, the message content analysis unit 113 may analyze the contents of the messages to calculate the user A's degree of good feeling for the user B and the user B's degree of good feeling for the user A.

In step S117, the message content analysis unit 113 determines the true meanings of the messages (i.e., the inputters' true feelings) based on the result of analyzing the input messages such as whether each message is from the heart or out of politeness or whether the user B has a good impression of the user A. As a result of the determination, if the message cannot be determined to be from the heart, the processing proceeds to step S118. If the message can be determined to be from the heart, the processing proceeds to step S121.

In step S118, the question information generation unit 114 generates the question information to be transmitted to the user B based on the contents of the messages analyzed by the message content analysis unit 113. The control unit 111 transmits the generated question information to the terminal device 211b.

In step S119, the user B inputs an answer to the question information transmitted in step S118. Specifically, the user B selects one of the options of question information and inputs the answer through the terminal input unit 213b of the terminal device 211b. The terminal device 211b transmits the input information as the answer information to the communication support server 101.

In step S120, the message storage unit 122 stores the answer information transmitted in step S119 in association with the message information on the user B.

In step S121, the assistance necessity determination unit 115 determines whether assistance through intervention by the communication support server 101 is necessary for the message exchanges between the users A and B based on the contents of the messages analyzed in step S116 or the answer information stored in step S120.

In step S122, the assist message generation unit 116 generates an assist message for the user A. For example, as shown in FIG. 6, the displayed message may be "Right, let's ask Aya out to a soccer game!", "The success rate is 80% or more! Good luck!", or "Watching a soccer game in a sport bar may be a good idea!" The control unit 111 transmits the generated assist message to the terminal device 211a.

In step S123, the terminal device 211a displays the assist message transmitted in step S122 only on the terminal display unit 212a. In accordance with the displayed assist message, the user A may input a message in step S110, for example, and transmit the message to the user B. Step S123 may be skipped, if no assist message has been generated in step S122.

In step S124, the communication support server 101 repeats the processing from step S107. As described above, once the repetitive processing by the terminal device 211a or 211b ends, the repetitive processing in steps S107 to S124 ends.

In step S125, the terminal device 211a repeats the processing in steps S108 to S125. Similarly, in step S126, the terminal device 211b repeats the processing in steps S109 to S126. If the user A or B wishes to end the message exchange, the repetitive processing ends.

As described above, the communication support system 1 according to this embodiment analyzes the contents of the messages input by the users, generates the question information on the users' feelings for the communication partners and the true meanings of the messages according to the analyzed contents of the messages, and checks the users' true feelings based on the answer information to the question information. As a result, the communication support system 1 generates, based on the users' true feelings, proper assist messages for the other users and establishes smooth communications through messages.

The assistance necessity determination unit 115 may function not only to determine whether assistance is necessary, but also to temporarily stop the transmission of the messages input by one of the users to the other. For example, the assist message generation unit 116 generates an assist message such as "it is better not to transmit any message now" for the user for notification. At the same time, buttons for selecting whether to transmit a message may be displayed on the terminal device 211 of the user. The user may transmit the input message as his wish. This allows the user to stop transmitting a message at a wrong time and establish a smoother communication through messages.

In the description of the flow, the contents of the messages are analyzed after the transmission. Alternatively, every time when the communication support server 101 receives an input message, the content of the message may be analyzed. The users A and B may not alternately input messages but one of the users A and B may continuously input messages.

(Program)

Now, details of a program for fulfilling the functions constituting the communication support server 101 according to this embodiment will be described.

Figure 9:
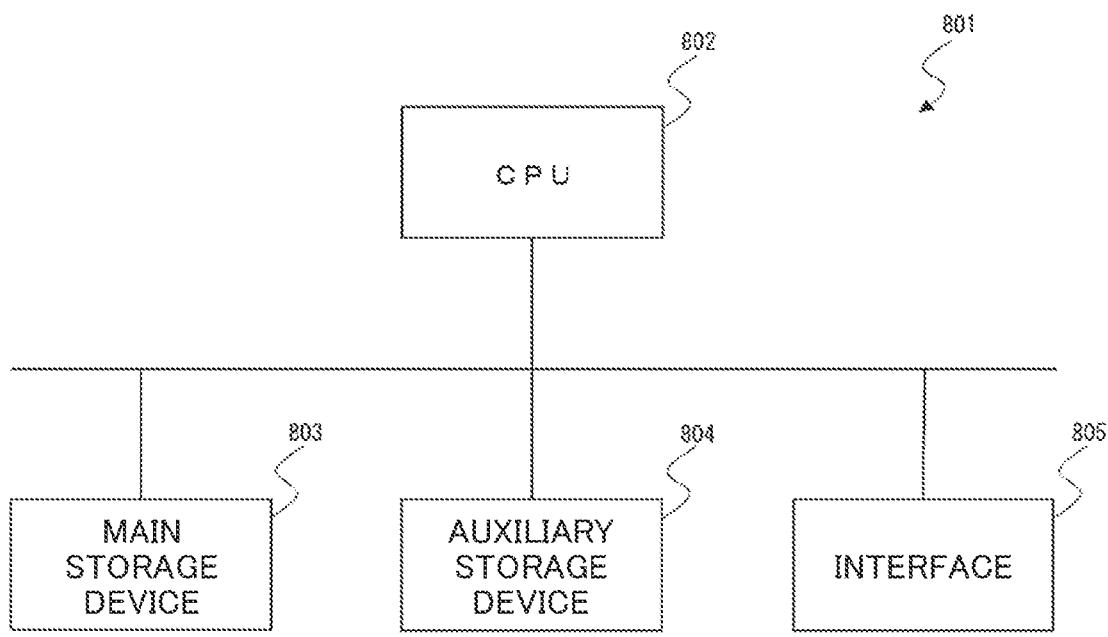
FIG. 9 is a schematic block diagram showing a configuration of a computer according to the embodiment of the present invention.

The communication support server 101 is mounted in a computer 801 shown in FIG. 9. The operations of the components of the communication support server 101 are stored in the form of a program in an auxiliary storage device 804. A CPU 802 reads the program from the auxiliary storage device 804, loads the program in a main storage device 803, and executes the processing described above in accordance with the program. In accordance with the program, the CPU 802 secures, in the main storage device 803, a storage area corresponding to the storage unit.

Specifically, the program causes a computer to execute: analyzing a content of a message transmitted from a first terminal device used by a first user and/or a second terminal device used by a second user; generating question information to be transmitted to the first user based on the content of the message analyzed; and generating an assist message to be transmitted only to the second terminal device based on answer information that is an answer of the first user to the question information.

The auxiliary storage device is an example of a tangible, non-transitory medium. Other examples of the tangible, non-transitory medium include a magnetic disk, a magneto-optical disk, a CD-ROM, a DVD-ROM, and a semiconductor memory connected via an interface. If this program is distributed to a computer via a network, the computer distributed with the program may load the program in its main storage device to execute the processing described above.

The program may fulfill some of the functions described above. Further, the program may be a what is called a "difference file" (or "difference program") that fulfills the functions described above in combination with another program already stored in the auxiliary storage device.

The embodiment described above may be implemented in other various forms. Various omissions, substitutions and changes may be made without departing from the spirit of the invention. The embodiment and variations thereof are included in the scope and spirit of the invention and also in the scope of the invention recited in the claims and equivalents thereof. The present invention is applicable to the occasion where support of communications is necessary between two or more people for a business negotiation, a B to B transaction, recruiting activities, communications between a couple, and expansion of friendship.

DESCRIPTION OF REFERENCE CHARACTERS

1 Communication Support System
101 Communication Support Server
111 Control Unit
112 Matching Candidate Extraction Unit
113 Message Content Analysis Unit
114 Question Information Generation Unit
115 Assistance Necessity Determination Unit
116 Assist Message Generation Unit
121 Personal Information Storage Unit
122 Message Storage Unit
211, 211a, 211b Terminal Device
212, 212a, 212b Terminal Display Unit
213, 213a, 213b Terminal Input Unit
801 Computer
802 CPU
803 Main Storage Device
804 Auxiliary Storage Device
805 Interface
NW Network

The invention claimed is:

1. A communication support server comprising a processor configured to:
analyze a content of a message transmitted from a first terminal device used by a first user and/or a second terminal device used by a second user, wherein the processor analyzes the message through machine learning trained using, as training data, past message exchanges between the first and second terminal devices;
attempt to determine from the message-content analysis whether the message from the first user to the second user honestly reflects the feelings of the first user toward the second user;
generate question information to be transmitted to the first user only when the processor cannot determine whether the message from the first user to the second user honestly reflects the feelings of the first user toward the second user;
generate an assist message to be transmitted only to the second terminal device based on answer information that is an answer of the first user to the question information;
determine whether an assist message is necessary based on the contents of the messages analyzed in the message-content analysis, and answer information that is an answer of the first user to the question information, and
generate the assist message to be transmitted only to the second terminal device when the assist-message determining step determines that the assist message is necessary.

2. The communication support server of claim 1, wherein the processor is further configured to generate the question information for checking a feeling of the first user for the second user or a true meaning of the message from the first user to the second user.

3. The communication support server of claim 1, wherein the processor is further configured to
generate the question information as a plurality of options, and generate the assist message according to an option selected by the first user from the plurality of options in the answer information.

4. The communication support server of claim 1, wherein the processor is further configured to calculate a degree of good feeling of the first user for the second user based on the answer information.

5. The communication support server of claim 1, wherein the processor is further configured to
determine whether assistance related to input of an other message is necessary for the second user, and
determine whether the assistance related to the input of the other message is necessary for the first user or the second user, based on the answer information.

6. The communication support server of claim 1, wherein the processor is further configured to transmit, to the first terminal device, the question information and transmit, to the second terminal device, the assist message.

7. The communication support server of claim 1, wherein the message is one message of a plurality of messages, the plurality of messages include
an honest message that honestly reflects the feelings of the first user toward the second user, and
a not-honest message that fails to honestly reflect the feelings of the first user toward the second user, and
the processor is further configured to determine from the message-content analysis whether the message from the first user to the second user honestly reflects the feelings of the first user toward the second user by distinguishing an honest message from the first user to the second user from a not-honest message from the first user to the second user.

8. The communication support server of claim 1, wherein the message is one message of a plurality of messages, the plurality of messages include
an honest message that honestly reflects the feelings of the first user toward the second user, and
a not-honest message that fails to honestly reflect the feelings of the first user toward the second user,
the processor is further configured to
attempt to determine from the message-content analysis whether the message from the first user to the second user honestly reflects the feelings of the first user toward the second user by distinguishing an honest message from the first user to the second user from a not-honest message from the first user to the second user, and
generate question information to be transmitted to the first user only when the processor fails to determine that the message from the first user to the second user honestly reflects the feelings of the first user toward the second user.

9. The communication support server of claim 1, wherein the processor is configured to determine from the message-content analysis whether the message from the first user to the second user honestly reflects the feelings of the first user toward the second user, based on
a) a plurality of other messages from the first user to the second user, and
b) a length of the message and the plurality of other messages,
c) a number of messages between the first and second users, or
d) a duration of each message exchange between the first and second users in a plurality of message exchanges.

10. The communication support server of claim 1, wherein the processor is configured to determine from the message-content analysis whether the message from the first user to the second user honestly reflects the feelings of the first user toward the second user, based on
a) a plurality of other messages from the first user to the second user,
b) a length of the message and the plurality of other messages,
c) a number of messages between the first and second users, and
d) a duration of each message exchange between the first and second users in a plurality of message exchanges.

11. A communication support system comprising:
a first terminal device used by a first user;
a second terminal device used by a second user; and
a communication support server connectable to the first terminal device and the second terminal device via a network,
the communication support server including a processor configured to:
analyze a content of a message transmitted from the first terminal device and/or the second terminal device, wherein the processor analyzes the message through machine learning trained using, as training data, past message exchanges between the first and second terminal devices;
attempt to determine from the message-content analysis whether the message from the first user to the second user honestly reflects the feelings of the first user toward the second user;
generate question information to be transmitted to the first user only when the processor cannot determine whether the message from the first user to the second user honestly reflects the feelings of the first user toward the second user;
generate an assist message to be transmitted only to the second terminal device based on answer information that is an answer of the first user to the question information;
determine whether an assist message is necessary based on the contents of the messages analyzed in the message-content analysis, and answer information that is an answer of the first user to the question information, and
generate the assist message to be transmitted only to the second terminal device when the assist-message determining step determines that the assist message is necessary.

12. The communication support system of claim 11, wherein
the communication support system is for displaying a gauge on a terminal display indicating the degree of good feeling felt by a user of another terminal display toward a user of the terminal display communicating with the user of the another terminal display,
the first terminal device includes
a display displaying messages, and
a touch panel, a keyboard independent from the display, or an audio input device for inputting the messages displayed on the display,
the second terminal device includes
a display displaying messages, and
a touch panel, a keyboard independent from the display, or an audio input device for inputting the messages displayed on the display; and the communication support server includes a processor connectable to the first terminal device and the second terminal device via a network, and the processor is configured to analyze a content of a message transmitted from the first terminal device and/or the second terminal device, and determine from the message-content analysis the degree of good feeling felt by the first user toward the second user and the degree of good feeling felt by the second user toward the first user, and transmit information on the degree of determined good feeling of the first and second users to the terminal devices of each other, the display of the first terminal device displays a gauge indicating the degree of good feeling felt by the second user toward the first user based on the degree of good feeling of the second user toward the first user determined by the processor and transmitted to the first terminal device by the processor, and the display of the second terminal device displays a gauge indicating the degree of good feeling felt by the first user toward the second user based on the degree of good feeling of the first user toward the second user determined by the processor and transmitted to the second terminal device by the processor.

13. The communication support system of claim 12, wherein the processor transmits the assist message only when the determined degree of good feeling satisfies a predetermined value.

14. A communication support method comprising:

analyzing with a processor a content of a message transmitted from a first terminal device used by a first user and/or a second terminal device used by a second user, wherein the processor analyzes the message through machine learning trained using, as training data, past message exchanges between the first and second terminal devices;

attempting to determine from the message-content analysis whether the message from the first user to the second user honestly reflects the feelings of the first user toward the second user;

generating question information to be transmitted to the first user only when the processor cannot determine whether the message from the first user to the second user honestly reflects the feelings of the first user toward the second user;

generating an assist message to be transmitted only to the second terminal device based on answer information that is an answer of the first user to the question information;

determining whether an assist message is necessary based on the contents of the messages analyzed in the message-content analysis, and answer information that is an answer of the first user to the question information, and generating the assist message to be transmitted only to the second terminal device when the assist-message determining step determines that the assist message is necessary.

* * * * *